United States Patent
Wang et al.

(10) Patent No.: US 10,552,272 B2
(45) Date of Patent: Feb. 4, 2020

(54) MAINTAINING HIGH AVAILABILITY DURING N-NODE FAILOVER

(71) Applicant: Nutanix, Inc., San Jose, CA (US)

(72) Inventors: Hexin Wang, Los Altos, CA (US); Igor Leonidovich Grobman, San Jose, CA (US)

(73) Assignee: NUTANIX, INC., San Jose, CA (US)

( * ) Notice: Subject to any disclaimer, the term of this patent is extended or adjusted under 35 U.S.C. 154(b) by 163 days.

(21) Appl. No.: 15/837,089

(22) Filed: Dec. 11, 2017

(65) Prior Publication Data
US 2018/0165166 A1 Jun. 14, 2018

Related U.S. Application Data

(60) Provisional application No. 62/434,398, filed on Dec. 14, 2016.

(51) Int. Cl.
*G06F 11/20* (2006.01)
*G06F 9/455* (2018.01)

(52) U.S. Cl.
CPC ...... *G06F 11/2033* (2013.01); *G06F 9/45558* (2013.01); *G06F 2201/815* (2013.01)

(58) Field of Classification Search
CPC ............... G06F 11/0712; G06F 11/142; G06F 11/1484; G06F 11/20; G06F 11/202; G06F 11/2023; G06F 11/203; G06F 11/2025; G06F 11/2028; G06F 11/2033; G06F 2201/815; G06F 9/45533; G06F 9/45558; G06F 2009/45562; G06F 2009/4557; G06F 9/5077
See application file for complete search history.

(56) References Cited

U.S. PATENT DOCUMENTS

| | | | |
|---|---|---|---|
| 7,302,608 B1 * | 11/2007 | Acharya | G06F 11/2023 714/13 |
| 8,230,069 B2 * | 7/2012 | Korupolu | H04L 67/1097 709/226 |
| 8,316,110 B1 * | 11/2012 | Deshmukh | G06F 11/1484 709/202 |
| 8,549,518 B1 | 10/2013 | Aron et al. | |

(Continued)

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

(Continued)

*Primary Examiner* — Gabriel Chu
(74) *Attorney, Agent, or Firm* — Foley & Lardner LLP (57) ABSTRACT

A system and method for reserving resources for a virtual machine to use during failure of an underlying node are disclosed. The system and method include a scheduling module that is configured to reserve resources for the virtual machine on at least one candidate node. To reserve the resources, the scheduling module is configured to identify a list of candidate nodes based upon a qualifier function, rank the candidate nodes based upon a priority function, and determine the candidate nodes that satisfy a high availability threshold. The scheduling module is also configured to select a highest-ranked candidate node that satisfies the high availability threshold and reserve the resources on the highest-ranked candidate node.

25 Claims, 8 Drawing Sheets

(56) References Cited

U.S. PATENT DOCUMENTS

| | | | | |
|---|---|---|---|---|
| 8,601,473 | B1 | 12/2013 | Aron et al. | |
| 8,850,130 | B1 | 9/2014 | Aron et al. | |
| 8,918,673 | B1* | 12/2014 | Rangaiah | G06F 11/008 714/4.11 |
| 9,424,152 | B1* | 8/2016 | Raut | G06F 11/2069 |
| 9,772,866 | B1 | 9/2017 | Aron et al. | |
| 2003/0051187 | A1* | 3/2003 | Mashayekhi | G06F 11/2028 714/4.11 |
| 2004/0181707 | A1* | 9/2004 | Fujibayashi | G06F 11/2069 714/6.12 |
| 2004/0243915 | A1* | 12/2004 | Doyle | G06F 11/203 714/796 |
| 2005/0193227 | A1* | 9/2005 | Nakahara | G06F 11/203 714/4.1 |
| 2007/0180314 | A1* | 8/2007 | Kawashima | G06F 11/2023 714/15 |
| 2007/0220318 | A1* | 9/2007 | Kalos | G06F 11/2094 714/13 |
| 2007/0271560 | A1* | 11/2007 | Wahlert | G06F 8/61 718/1 |
| 2010/0232288 | A1* | 9/2010 | Coatney | G06F 11/2033 370/221 |
| 2010/0293256 | A1* | 11/2010 | Machida | G06F 11/2028 709/220 |
| 2011/0022882 | A1* | 1/2011 | Jaehde | G06F 11/2023 714/4.1 |
| 2011/0029675 | A1* | 2/2011 | Yeow | G06F 11/2041 709/226 |
| 2011/0214005 | A1* | 9/2011 | Biran | G06F 11/008 714/1 |
| 2011/0214007 | A1* | 9/2011 | Sreenivasan | H04L 69/40 714/4.11 |
| 2011/0239215 | A1* | 9/2011 | Sugai | G06F 9/45558 718/1 |
| 2013/0054807 | A1* | 2/2013 | Sherwood | H04L 67/1095 709/226 |
| 2014/0149784 | A1* | 5/2014 | Ngo | H04L 67/1008 714/4.11 |
| 2014/0317441 | A1* | 10/2014 | Arata | G06F 11/20 714/4.12 |
| 2015/0074447 | A1* | 3/2015 | Park | G06F 9/45533 714/4.11 |
| 2015/0205650 | A1* | 7/2015 | Shimada | G06F 11/004 714/703 |
| 2016/0004552 | A1* | 1/2016 | Innan | G06F 9/5088 718/1 |

OTHER PUBLICATIONS

Poitras, Steven. "The Nutanix Bible" (Jan. 12, 2016), from https://nutanixbible.com/.
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jun. 25, 2018), from https://nutanixbible.com/.
Poitras, Steven. "The Nutanix Bible" (Jan. 3, 2017), from https://nutanixbible.com/.
Poitras, Steven. "The Nutanix Bible" (Jan. 3, 2018), from https://nutanixbible.com/.
Poitras, Steven. "The Nutanix Bible" (Sep. 4, 2015), from https://nutanixbible.com/.
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jan. 8, 2019), from https://nutanixbible.com/.
Poitras, Steven. "The Nutanix Bible" (Jun. 8, 2017), from https://nutanixbible.com/.
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Jun. 9, 2016), from https://nutanixbible.com/.

* cited by examiner

MAINTAINING HIGH AVAILABILITY DURING N-NODE FAILOVER

CROSS-REFERENCE TO RELATED PATENT APPLICATIONS

This application claims priority to U.S. Provisional Application No. 62/434,398, filed on Dec. 14, 2016, the entirety of which is incorporated by reference herein.

BACKGROUND

A virtual machine ("VM") may refer to a specific software-based implementation of a machine in a virtualization environment, in which the hardware resources of a real computer (e.g., CPU, memory, etc.) are virtualized or transformed into the underlying support for the fully functional virtual machine that can run its own operating system and applications on the underlying physical resources just like a real computer.

Virtualization works by inserting a thin layer of software directly on the computer hardware or on a host operating system. This layer of software contains a virtual machine monitor or "hypervisor" that allocates hardware resources dynamically and transparently. Multiple operating systems run concurrently on a single physical computer and share hardware resources with each other. By encapsulating an entire machine, including CPU, memory, operating system, and network devices, a virtual machine is completely compatible with most standard operating systems, applications, and device drivers. Most modern implementations allow several operating systems and applications to safely run at the same time on a single computer, with each having access to the resources it needs when it needs them.

Virtualization allows one to run multiple virtual machines on a single physical machine, with each virtual machine sharing the resources of that one physical computer across multiple environments. Different virtual machines can run different operating systems and multiple applications on the same physical computer.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine is not utilized to perform useful work. This is wasteful and inefficient if there are users on other physical machines which are currently waiting for computing resources. To address this problem, virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

Furthermore, there are now products that can aggregate multiple physical machines, running virtualization environments to not only utilize the processing power of the physical devices to aggregate the storage of the individual physical devices to create a logical storage pool wherein the data may be distributed across the physical devices but appears to the virtual machines to be part of the system that the virtual machine is hosted on. Such systems operate under the covers by using metadata, which may be distributed and replicated any number of times across the system, to locate the indicated data. These systems are commonly referred to as clustered systems, wherein the resources of the group are pooled to provide logically combined, but physically separate systems.

SUMMARY

In accordance with one aspect of the present disclosure, a system is disclosed. The system includes a plurality of nodes in a virtualization environment, with each of the plurality of nodes having a plurality of virtual machines. The system also includes a scheduling module in the virtualization environment. The scheduling module is configured to reserve resources for each of the plurality of virtual machines of a first node on at least one candidate node. The at least one candidate node is part of the plurality of nodes and separate from the first node, and to reserve the resources for each of the plurality of virtual machines, the scheduling module is configured to identify a list of candidate nodes based upon a qualifier function, rank the candidate nodes based upon a priority function, and determine the candidate nodes that satisfy a high availability threshold. The scheduling module is also configured to select a highest-ranked candidate node that satisfies the high availability threshold and reserve the resources on the highest-ranked candidate node for the each of the plurality of virtual machines for operation during failure of the first node.

In accordance with other aspects of the present disclosure, a method is disclosed. The method includes identifying, by a scheduling module, candidate nodes for allocating resources for a virtual machine that resides on a first node. The first node is separate from the candidate nodes, and the scheduling module, the candidate nodes, and the first node are part of a virtualization environment. The scheduling module identifies the candidate nodes based upon a qualifier function. The method also includes ranking, by the scheduling module, the candidate nodes based upon a priority function, determining, by the scheduling module, the candidate nodes that satisfy a high availability threshold, and reserving, by the scheduling module, the resources on a highest-ranked candidate node that satisfies the high availability threshold, such that the virtual machine is configured to operate on the reserved resources during failure of the first node.

In accordance with yet other aspects of the present disclosure, a non-transitory computer readable media is disclosed. The non-transitory computer readable media has computer-executable instructions embodied thereon that, when executed by a processor of a virtualization environment, causes the processor to identify a list of candidate nodes based upon a qualifier function to reserve resources for a virtual machine of a first node, and the candidate nodes are separate from the first node and part of the virtualization environment. The instructions also cause the process to rank the candidate nodes based upon a priority function, determine the candidate nodes that satisfy a high availability threshold, and select a highest-ranked candidate node that satisfies the high availability threshold and reserve the resources on the highest-ranked candidate node for the virtual machine for operation during failure of the first node.

The foregoing summary is illustrative only and is not intended to be in any way limiting. In addition to the illustrative aspects, embodiments, and features described above, further aspects, embodiments, and features will become apparent by reference to the following drawings and the detailed description.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

This disclosure is directed to a system and method for allocating resources in case of one or more node failures in a virtualization environment. As discussed in greater detail below, the virtualization environment includes one or more clusters, with each cluster having one or more nodes (also called host machines) and with each node having one or more virtual machines. Since the virtual machines on a particular node use the various hardware and software resources of the underlying node, during a failure of a particular node, the virtual machines on the failed node may be rendered non-operational until the failed node recovers from the failure. To minimize such disruptions on the operations of the virtual machines due to failures of an underlying node, the present disclosure provides a scheduling module that reserves resources for each virtual machine in the virtualization environment for use during failure of the underlying node.

The resources are reserved on other nodes within the virtualization environment. In some embodiments, the scheduling module may reserve resources for each virtual machine on other nodes of the same cluster, nodes of another cluster, or a combination thereof. By reserving resources for a particular virtual machine on another node, the virtual machines of a failed node may be restarted on the node having the reserved resources, thereby minimizing disruptions to the operations of that virtual machine. For example, if Node 1 has 2 virtual machines (VM1 and VM2), the scheduling module may reserve resources for each of VM1 and VM2 on other nodes (e.g., Node 2) in the virtualization environment. During failure of the Node 1, the scheduling module may restart VM1 and VM2 on Node 2 instead of Node 1. It is to be understood that all the virtual machines on a particular node need not have reserved resources on the same node. Thus, VM1 may have reserved resources on Node 2 and VM2 may have reserved resources on Node 3. In some embodiments, to account for multiple node failures, the scheduling module may reserve resources for some or all virtual machines on multiple nodes. Thus, the scheduling module may reserve resources for both VM1 and VM2 on both Nodes 2 and 3. In other embodiments, the scheduling module may reserve resources for VM1 on both Nodes 2 and 3, and reserve resources for VM2 on only Node 2.

The scheduling module takes into account multiple factors in determining which nodes to reserve resources on and how many nodes to reserve resources on. For example, in some embodiments, the scheduling module looks at the amount and type of resources (e.g., CPU, Memory, etc.) that a particular virtual machine for which resources have to reserved needs to operate properly. The scheduling module may also look at the resources that are consumed by virtual machines on other nodes on which resources may potentially be reserved and whether those nodes have resources available to accommodate other virtual machines if needed. The scheduling module may look at other factors (also called qualifier functions) in identifying a list of candidate nodes on which resources may potentially be reserved. For example, if a particular node only has enough resources to operate the virtual machines that are originally on that node, such a node may not be a good candidate for reserving resources. The scheduling module may use other or additional qualifier functions to identify the list of the candidate nodes. The qualifier functions may be pre-determined and pre-programmed within the scheduler module.

Upon identifying the list of the candidate nodes on which resources may be reserved, the scheduling module may rank the candidate nodes in the list based on certain criteria (also called priority functions). The scheduling module may take various factors into account in ranking the various candidate nodes. For examples, the candidate nodes that have more resources to spare than other nodes may be ranked higher. Candidate nodes that are less likely to fail may also be ranked higher. The priority functions may be pre-defined and pre-programmed within the scheduling module. In some embodiments, each priority function may be assigned a weight, such that candidate nodes having higher weighted priority functions may be ranked higher. Thus, based upon the desired requirements for operating the virtualization environment, the priority functions may vary.

From the ranked candidate nodes, the scheduling module may determine which candidate nodes are "highly available" or in other words, satisfy a high availability threshold. In some embodiments, "highly available" candidate nodes are those nodes that have sufficient resources to satisfy the resource requirements of another virtual machine and still function without impact or significant impact to the existing virtual machines on that node. For example, the scheduling module may determine that VM1 needs a specific type of a graphic card to operate properly. Then, to reserve resources for VM1 on other ranked candidate nodes, the scheduling module may find candidate nodes that have the same graphic card as needed by VM1. If only Node 2 has that graphic card and Node 3 does not, then Node 2 may be considered "highly available" (and therefore potentially satisfies the high availability threshold) and the scheduling module may attempt to reserve resources for VM1 on Node 2 subject to any additional conditions being satisfied. These additional conditions may look at other factors (e.g., hardware software policy constraints, etc.) in determining which nodes to reserve resources on.

Once the scheduling module identifies one or more "highly available" candidate node(s) (e.g., a candidate node that satisfies the high availability threshold), the scheduling module may reserve parcels or segments of resources on one or more of the highest-ranked candidate nodes that are "highly available" for a particular virtual machine. That particular virtual machine is intended to use the reserved resources only during failure of its underlying node. However, the virtual machines on the candidate node on which the resources have been reserved may continue to use the reserved resources until those resources are needed in failure conditions. For example, if VM1 has reserved resources on Node 2, the virtual machines on Node 2 may continue to use the reserved resources until VM1 needs the reserved resources due to failure of Node 1 on which VM1 originally resides. In some embodiments, the scheduling module may use a look up table to map each virtual machine with the nodes having their reserved resources. Upon detecting a failure of an underlying node, the scheduling module may consult the look-up table and find the virtual machines from the failed node and map those virtual machines to the nodes having their reserved resources. The scheduling module may then restart those virtual machines on the nodes with the reserved resources. In some embodiments, once the failed node is back up again, the scheduling module may move the virtual machines back to that node, thereby freeing up the reserved resources for use again. In other embodiments, the scheduling module may use other mechanisms for mapping the virtual machines to their respective reserved resources.

As noted above, some virtual machines may have resources reserved on multiple nodes. Likewise, in some embodiments, certain resources may be reserved for multiple virtual machines. For example, a resource X may be reserved for both VM1 on Node 1 and VM2 on Node 2. Specifically, the scheduling module may be configured to handle a particular number of node failures. For example, in some embodiments, the scheduling module may be configured to handle one node failure. In such cases, the scheduling module may be configured to guarantee availability of resources for virtual machines on any one node. For example, if the scheduling module is configured for handling a single node failure, if Node 1 fails, the scheduling module guarantees that all virtual machines on Node 1 have available reserved resources on other nodes (e.g., Node 2) and can be restarted on Node 2. In these cases, even if the virtual machines on Node 3 also have the same resources reserved on Node 2, since Node 3 is still functioning, those reserved resources are not needed by Node 3. Thus, both Nodes 1 and 3 may have reserved resources on Node 2, but only one of Nodes 1 and 3 may use the reserved resources at a time if the scheduling module is configured to handle a single node failure. When Node 1 recovers from the failure, the virtual machines of Node 1 are migrated back from Node 2 to Node 1, thereby freeing up the reserved resources for use again in the future by either Node 1 or Node 3. Thus, by overlapping reserved resources, the scheduling module is able to reserve resources effectively for all virtual machines in the virtualization environment and maintain availability of those reserved resources when needed.

In other embodiments, the scheduling module may be configured to handle more than one node failure. In such cases, the scheduling module may reserve resources such that the virtual machines on any two nodes within the virtualization environment are guaranteed resources during failure of their underlying nodes. Thus, the configuration of the scheduling module may vary from one embodiment to another.

Furthermore, the scheduling module reserves resources for a particular virtual machine at the time of creating that virtual machine. Thus, when a virtual machine is created on a particular node, the scheduling node may analyze the requirements of that virtual machine, the availability of resources on the other nodes in the virtualization environment, as well any other factors or policies, and reserve resources for the new virtual machine. As part of reserving resources for the new virtual machine, the scheduling module may need to evaluate the resources already reserved for the existing virtual machines and reassign or reallocate some of those already reserved resources to ensure high availability during node failures. The reserving of resources to plan for a potential node failure is termed herein as a "failover plan," "failure plan," or the like. Furthermore, when a particular virtual machine is moved to a reserved resource, the scheduling module is configured to not accept any new virtual machines until the failed node(s) are received.

By virtue of reserving resources for virtual machines, the present disclosure improves the reliability and robustness of the virtualization environment and increases user satisfaction by minimizing the impact from node failures. Computer functionality is also improved because existing resources are more efficiently used and shared between various components. Operation of virtual machines is improved since the virtual machines are not solely dependent upon the resources of the underlying node.

Figure 1A:
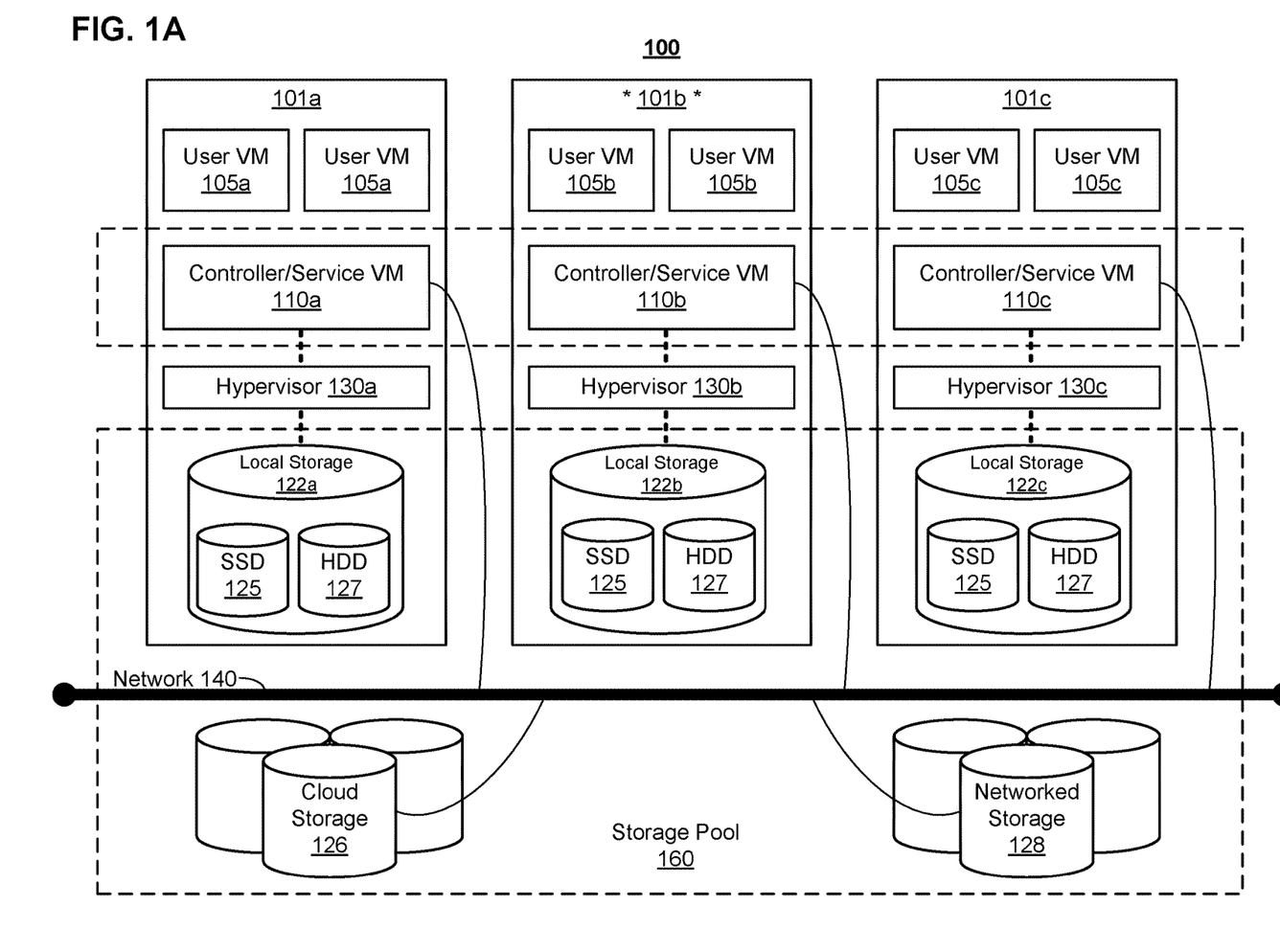
FIG. 1A is an example block diagram of a virtualization environment, in accordance with some embodiments of the present disclosure.

FIG. 1A illustrates a clustered virtualization environment 100 according to particular embodiments. The architecture of FIG. 1A can be implemented for a distributed platform that contains multiple host machines (a.k.a. nodes) 101*a-c* that manage multiple tiers of storage. The multiple tiers of storage may include storage that is accessible through network 140, such as, by way of example and not limitation, cloud storage 126 (e.g., which may be accessible through the Internet), network-attached storage (NAS) 128 (e.g., which may be accessible through a LAN), or a storage area network (SAN). Unlike the prior art, the present embodiment also permits local storage 122*a-c* that is incorporated into or directly attached to the host machine and/or appliance to be managed as part of storage pool 160. Examples of such local storage include Solid State Drives 125 (henceforth "SSDs"), Hard Disk Drives 127 (henceforth "HDDs" or "spindle drives"), optical disk drives, external drives (e.g., a storage device connected to a host machine via a native drive interface or a serial attached SCSI interface), or any other direct-attached storage. These storage devices, both direct-attached and network-accessible, collectively form storage pool 160. Virtual disks (or "vDisks") may be structured from the physical storage devices in storage pool 160, as described in more detail below. As used herein, the term vDisk refers to the storage abstraction that is exposed by a Controller/Service VM (CVM) 110 to be used by a user VM 105. In particular embodiments, the vDisk may be exposed via iSCSI ("internet small computer system interface") or NFS ("network file system") and is mounted as a virtual disk on the user VM. In particular embodiments, vDisks may be organized into one or more volume groups (VGs).

Each host machine 101*a-c* may run virtualization software, such as VMWARE ESX(I), MICROSOFT HYPER-V, or REDHAT KVM. The virtualization software includes hypervisor 130*a-c* to create, manage, and destroy user VMs 105*a-c* (collectively called "VMs 105"), as well as managing the interactions between the underlying hardware and user VMs 105. User VMs 105 may run one or more applications that may operate as "clients" with respect to other elements within virtualization environment 100. Though not depicted in FIG. 1A, a hypervisor may connect to network 140. In particular embodiments, a host machine 101 may be a physical hardware computing device; in particular embodiments, a host machine 101 may be a virtual machine.

CVMs 110*a-c* (collectively called "CVMs 110") are used to manage storage and input/output ("I/O") activities according to particular embodiments. These special VMs act as the storage controller in the currently described architecture. Multiple such storage controllers may coordinate within a cluster to form a unified storage controller system. CVMs 110 may run as virtual machines on the various host machines 122, and work together to form a distributed system 110 that manages all the storage resources, including local storage 122, NAS 128, and cloud storage 126. The CVMs may connect to network 140 directly, or via a hypervisor. Since the CVMs run independent of hypervisors 130*a-c*, this means that the current approach can be used and implemented within any virtual machine architecture, since the CVMs of particular embodiments can be used in conjunction with any hypervisor from any virtualization vendor.

A host machine may be designated as a leader node within a cluster of host machines. For example, host machine 101*b*, as indicated by the asterisks, may be a leader node. A leader node may have a software component designated to perform operations of the leader. For example, CVM 110*b* on host machine 101*b* may be designated to perform such operations. A leader may be responsible for monitoring or handling requests from other host machines or software components on other host machines throughout the virtualized environment. If a leader fails, a new leader may be designated. In particular embodiments, a management module (e.g., in the form of an agent) may be running on the leader node.

Each CVM 110*a-c* exports one or more block devices or NFS server targets that appear as disks to user VMs 105*a-c*. These disks are virtual, since they are implemented by the software running inside CVMs 110*a-c*. Thus, to user VMs 105*a-c*, CVMs 110*a-c* appear to be exporting a clustered storage appliance that contains some disks. All user data (including the operating system) in the user VMs 105*a-c* and reside on these virtual disks.

Significant performance advantages can be gained by allowing the virtualization system to access and utilize local storage 122 as disclosed herein. This is because I/O performance is typically much faster when performing access to local storage 122 as compared to performing access to NAS 128 across a network 140. This faster performance for locally attached storage 122 can be increased even further by using certain types of optimized local storage devices, such as SSDs. Further details regarding methods and mechanisms for implementing the virtualization environment illustrated in FIG. 1A are described in U.S. Pat. No. 8,601,473, which is hereby incorporated by reference in its entirety.

Figure 1B:
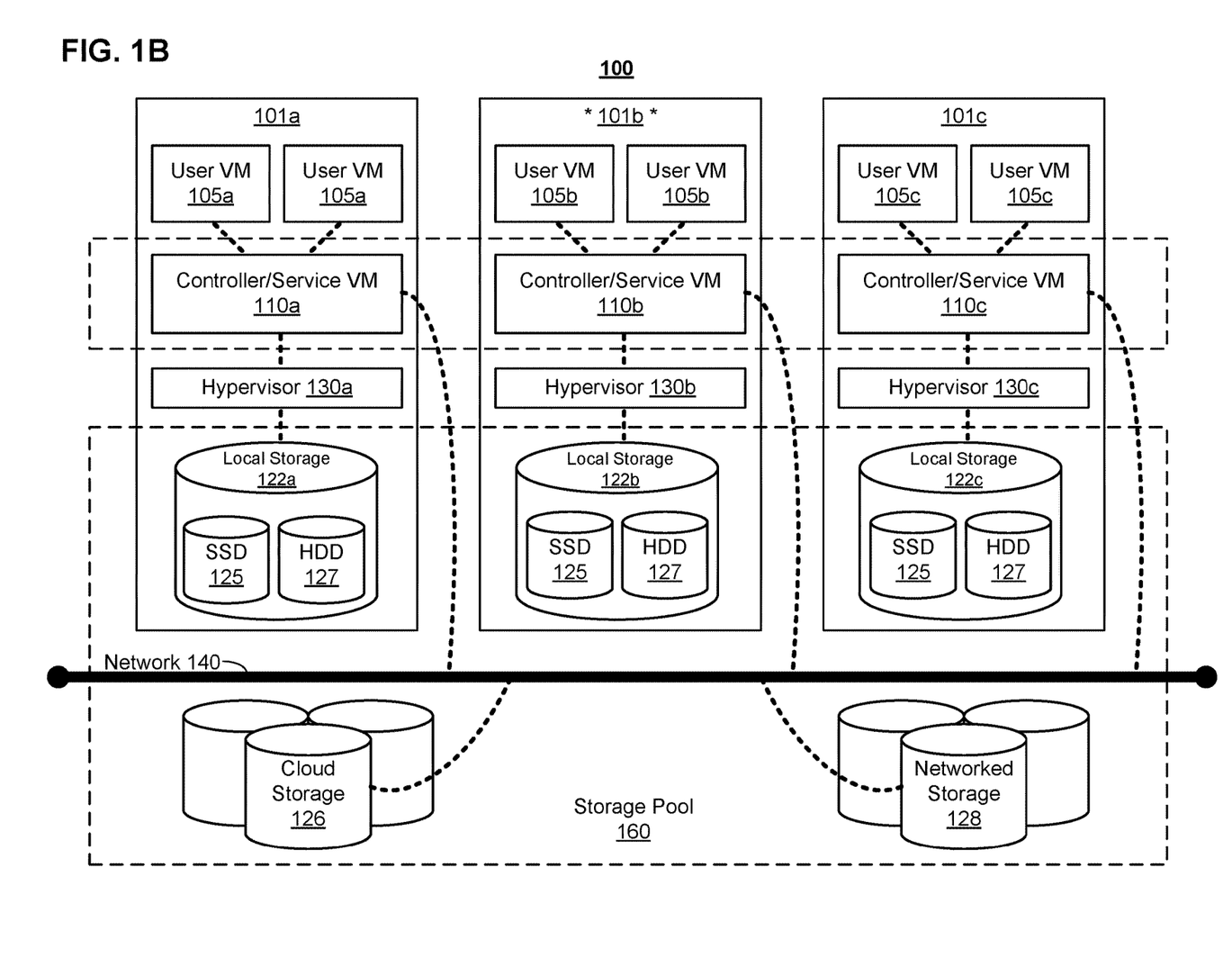
FIG. 1B is a block diagram showing an example of data flow within the virtualization environment of FIG. 1A, in accordance with some embodiments of the present disclosure.

FIG. 1B illustrates data flow within an example clustered virtualization environment 100 according to particular embodiments. As described above, one or more user VMs and a CVM may run on each host machine 101 along with a hypervisor. As a user VM performs I/O operations (e.g., a read operation or a write operation), the I/O commands of the user VM may be sent to the hypervisor that shares the same server as the user VM. For example, the hypervisor may present to the virtual machines an emulated storage controller, receive an I/O command and facilitate the performance of the I/O command (e.g., via interfacing with storage that is the object of the command, or passing the command to a service that will perform the I/O command). An emulated storage controller may facilitate I/O operations between a user VM and a vDisk. A vDisk may present to a user VM as one or more discrete storage drives, but each vDisk may correspond to any part of one or more drives within storage pool 160. Additionally or alternatively, CVM 110*a-c* may present an emulated storage controller either to the hypervisor or to user VMs to facilitate I/O operations. CVM 110*a-c* may be connected to storage within storage pool 160. CVM 110*a* may have the ability to perform I/O operations using local storage 122*a* within the same host machine 101*a*, by connecting via network 140 to cloud storage 126 or NAS 128, or by connecting via network 140 to local storage 122*b-c* within another host machine 101*b-c* (e.g., via connecting to another CVM 110*b* or 110*c*). In particular embodiments, any suitable computing system 500 may be used to implement a host machine 101.

When initially placing (e.g., creating) a user VM into a virtualization environment (e.g., the virtualization environment 100), a scheduling module in the hypervisor may account for resource (e.g., CPU or memory) allocation planning in order to prioritize high availability of resources across the virtualization environment. High availability of resources means planning for the possibility of failure of one or more nodes in a cluster and reserving parcels of available resources on other (presumably available) nodes in the cluster to support the option of moving VMs from failed nodes to the other available nodes. As used herein, "resources" may include memory, CPU, virtual graphics cards, or any other hardware, software, or firmware element(s) that a VM may need in performing a certain operation or task. The scheduling module may take into account consumption of multiple types of resources (e.g., CPU, as well as memory) by VMs running on nodes in the cluster. In some embodiments, a scheduling module may account for failure of one or more nodes in the cluster. The scheduling module may consider other factors in addition to or instead of the factors mentioned above in determining the resource allocation for VMs during failure of nodes. For example, the scheduling module may consider factors such as, by way of example and not limitation:

- individual and collective resource requirements (e.g., any individual user VM 105 may have its own resource requirements; in another example, the CVMs 110 may collectively have resource requirements);
- affinity and anti-affinity specifications (e.g., there may be a preference for keeping certain VMs together on the same host machine; conversely, there may be a preference for maintaining no more than one CVM 110 on any host machine);
- Hardware, software, or other policy constraints (certain VMs may need to be placed on host machines other than the leader node, in order to reduce the risk of crashing the leader node);
- Quality of Service ("QoS") requirements (certain high-priority VMs may need to be placed on host machines that are guaranteed to have high resource availability);
- data locality (e.g., certain VMs may have preference for placement on certain host machines in order to maintain access to data stored in local storage); and/or
- inter-workload interference.

The scheduling module may also account for detected events that affect the availability of resources, such as current CPU or memory consumption, historical/average CCPU or memory consumption, CPU or memory consumption patterns (e.g., regular fluctuations over a day or a week), VM power-off, VM failover, host machine failover. Certain types of detected events may cause a divergence between the actual state of the cluster and the scheduling module's view of the state of the system (e.g., when a host machine is disconnected then reconnected, when a leader node crashes, or when a host machine crashes in the middle of a VM power-off or VM migration); in order to reconcile the scheduling module's view with the actual state of the system, particular embodiments may remove VMs that have been powered off in the meantime.

In order to help with maintaining high availability during VM placement, the scheduling module may be consulted to determine optimal resource allocation prior to taking certain actions such as, by way of example and not limitation:
placement of a newly created VM;
migration of a VM;
removal of a host machine from the cluster;
addition of a host machine to the cluster;
creation of a failover plan; or
pinning a VM to a host machine.

Figure 2A:
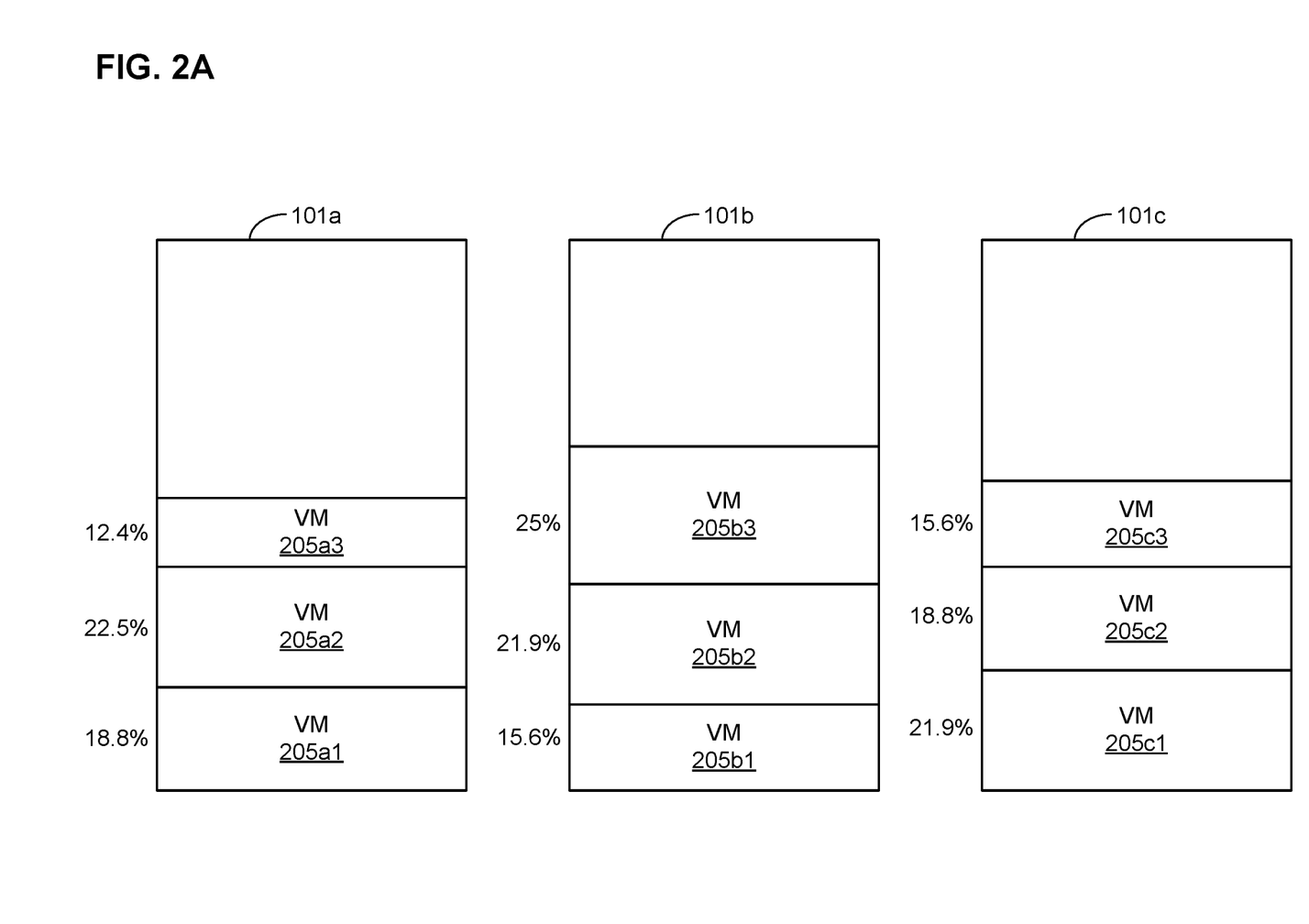
FIGS. 2A-2C are block diagrams showing examples of resource reservations, in accordance with some embodiments of the present disclosure.

FIG. 2A is a schematic illustrating consumption of parcels of resources, such as memory, by six VMs running on three host machines. As shown, VMs 205a1, 205a2, and 205a3 running on host machine 101a respectively consume 18.8%, 22.5%, and 12.4% of total available memory on host machine 101a; VMs 205b1, 205b2, and 205b3 running on host machine 101b respectively consume 15.6%, 21.9%, and 25% of total available memory on host machine 101b; and VMs 205c1, 205c2, and 205c3 running on host machine 101c respectively consume 21.9%, 18.8%, and 15.6% of total available memory on host machine 101c.

Figure 2B:
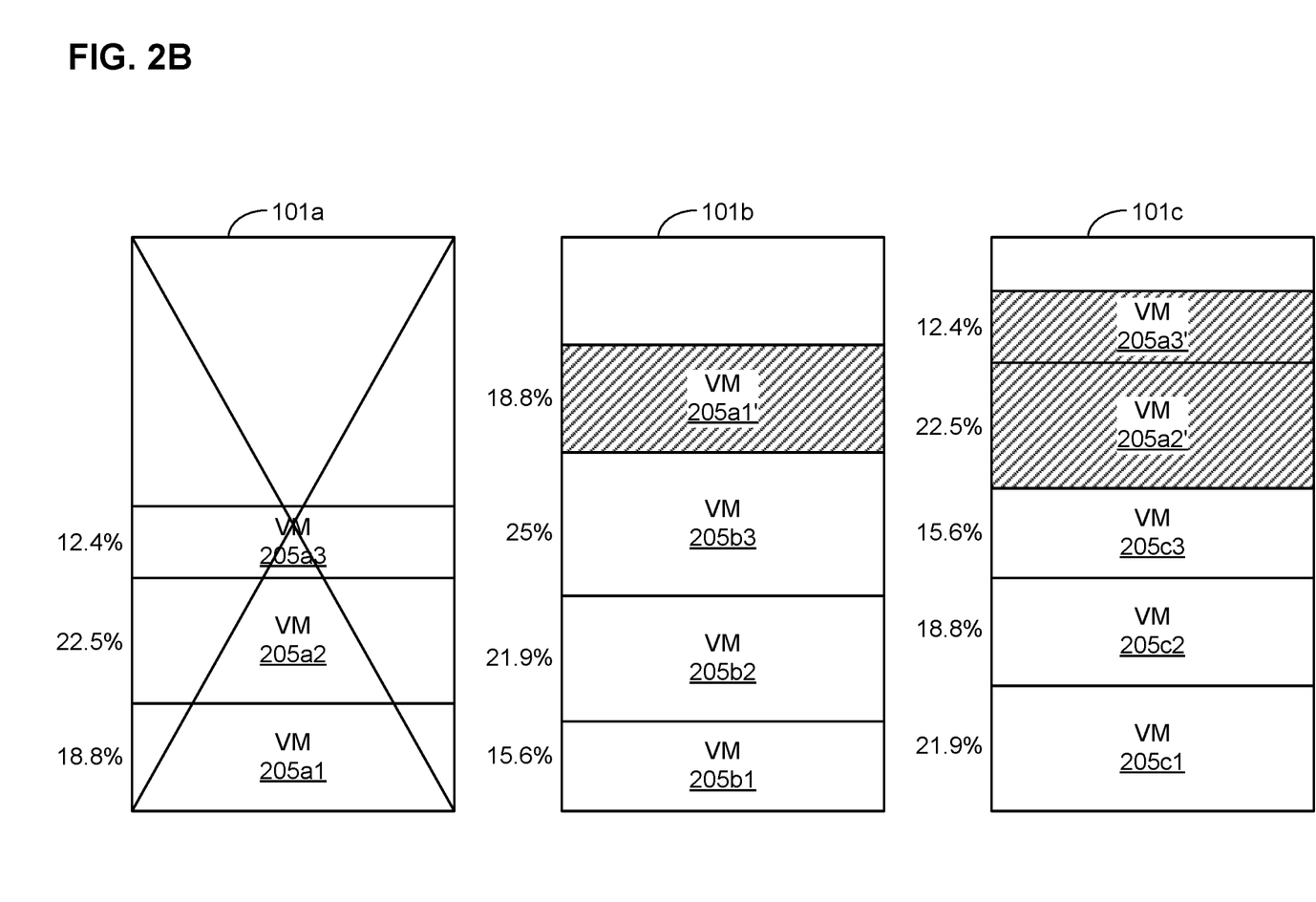

FIG. 2B is a schematic illustrating resource parcel reservation in a failover plan for host machine 101a, wherein VMs 205a1, 205a2, and 205a3 running on host machine 101a are moved to host machines 101b and 101c. Under this failover plan, parcels of resources for VM 205a1 are reserved on host machine 101b (see shaded box for VM 205a1') and parcels of resources for VMs 205a2 and 205a3 are reserved on host machine 101c (see shaded boxes for VMs 205a2' and 205a3'). As is apparent from FIG. 2B, this cluster is only able to handle failure of one host machine at a time (at least with respect to memory usage), since, after failure of host machine 101a, there is not sufficient available memory on either host machine 101b (which is at 81.3% estimated usage after reserving resources for VM 205a1') or host machine 101c (which is at 91.2% estimated usage after reserving resources for VMs 205a2' and 205a3') to be able to withstand failure of the other host machine.

Figure 2C:
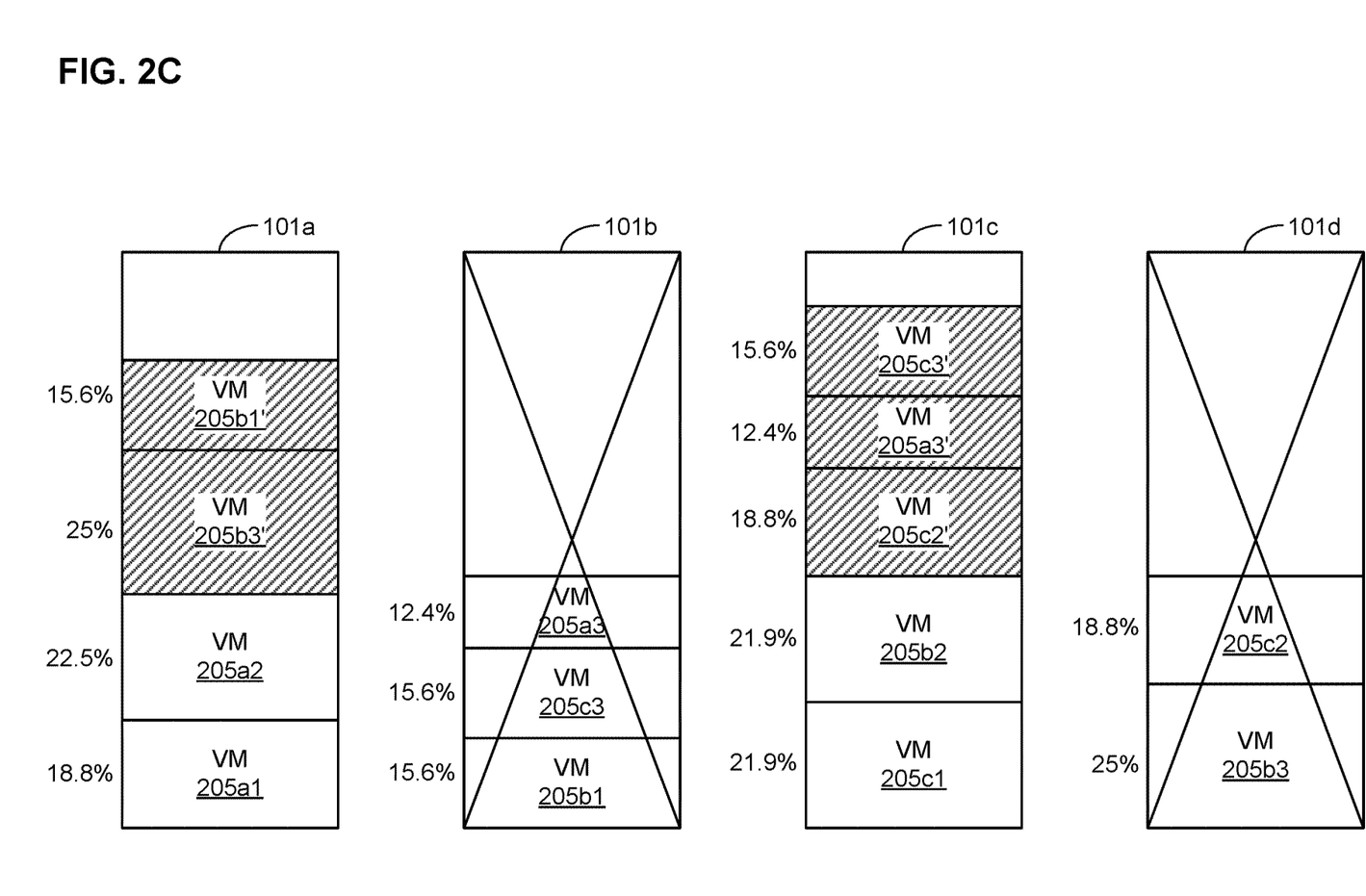

FIG. 2C is a schematic illustrating redistribution of VMs 205 after a new node (host machine 101d) is added in order to maintain a high availability cluster that can support two-node failover plan for host machines 101b and 101d. As shown, VMs 205a1 and 205a2 (which are running on host machine 101a) respectively consume 18.8% and 22.5% of total available memory on host machine 101a. VMs 205b1, 205c3, and 205a3 running on host machine 101b respectively consume 15.6%, 15.6%, and 12.4% of total available memory on host machine 101b. VMs 205c1 and 205b2 running on host machine 101c respectively consume 21.9% and 21.9% of total available memory on host machine 101c. VMs 205b3 and 205c2 running on host machine 101d respectively consume 25% and 18.8% of total available memory on host machine 101d.

The failover plan for host machines 101b and 101d comprises reservation of parcels of resources for VMs 205b1, 205c3, and 205a3 on host machines 101a (see shaded box for VM 205b1') and 101c (see shaded boxes for VMs 205c3' and 205a3'), as well as reservation of parcels of resources for VMs 205b3 and 205c2 on host machines 101a (see shaded box for VM 205b3') and 101c (see shaded box for VM 205c2'). As shown FIG. 2C, with the addition of host machine 101d, the cluster is now able to handle failure of two host machines at a time (at least with respect to memory usage).

Figure 3:
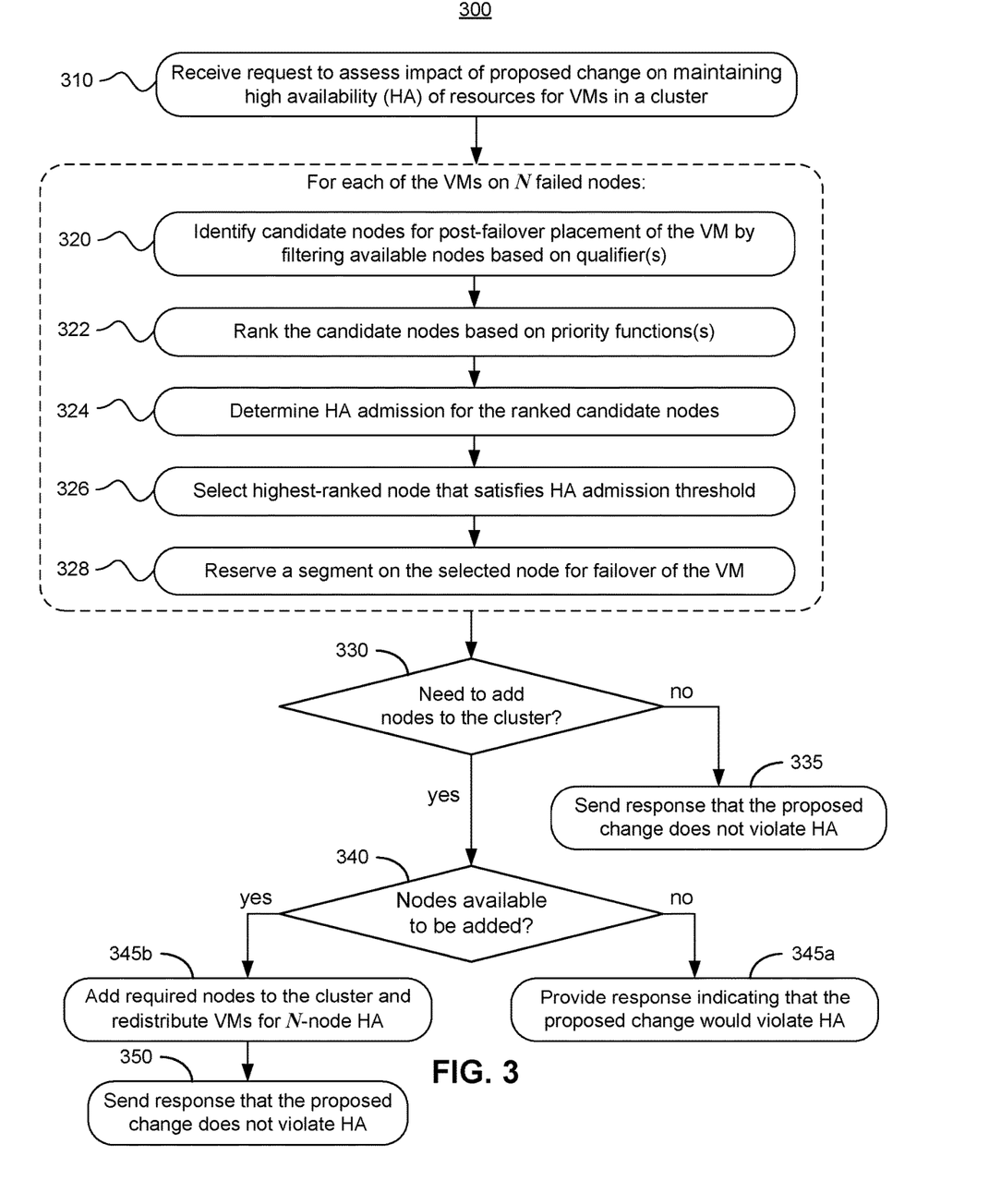
FIG. 3 is an example flowchart outlining operations for reserving resources within the virtualization environment of FIG. 1A, in accordance with some embodiments of the present disclosure.

FIG. 3 is a flowchart illustrating operations for an example method of determining whether a cluster can withstand N-node failover if a proposed change is implemented. In operation 310, the scheduling module receives a request to assess the impact of a proposed change (e.g., such as adding a new VM to a host machine in the cluster) to the virtualization environment 100 on maintaining high availability of resources for VMs in the cluster. In order to respond to the request, the scheduling module may access one or more factors discussed above. The scheduling module may also assess the ability to continue normal operations if one or more nodes fail (e.g., crash, become unresponsive, or otherwise become unavailable). Operations 320-328 may assess failover plans for every permutation of pairs of failed nodes in order to assess the ability to place VMs from the failed nodes onto other nodes.

In operation 320, the scheduling module identifies candidate nodes for post-failover placement of the VM by filtering available nodes based on one or more qualifier functions. For example, a qualifier function may determine whether potential candidate nodes have sufficient quantities of the resource in question available. In another example, a qualifier function may identify potential candidate nodes based on affinity rules. In another example, a qualifier function may identify potential candidate nodes based on whether other resources (e.g., particular required and/or preferred ports) are available.

In operation 322, the scheduling module ranks the candidate nodes based on one or more priority functions, such as, by way of example and not limitation: identifying nodes that are lightly loaded, identifying nodes with which the VM has an affinity, or identifying nodes that have a balanced CPU or memory usage rate. In particular embodiments, the final ranking score for each of the candidates nodes may comprise a sum of each of the priority functions. In particular embodiments, each of the priority functions may be weighted.

In operation 324, the scheduling module determines admission of high availability for the ranked candidate nodes. In particular embodiments, if placement of a given VM on a given candidate node does not support high availability, the candidate node may be dropped from eligibility for placement of the VM (but not necessarily dropped from eligibility for placement of all VMs). In particular embodiments, when assessing whether placement of the VM on the candidate node would support high availability, a parcel of resources may be reserved as overhead (e.g., for a hypervisor running on the node, for other processes running on the node, or in order to prevent a single process from growing to consume most or all available resources on the node (e.g., sshd/login, bash, top/kill). In some embodiments, the scheduling module may determine which of the ranked candidate nodes satisfy a high availability threshold (also referred to herein as a high availability admission threshold). The high availability threshold may be based at least upon the resources needed by a given VM and the resources available on the ranked candidate nodes. For example, if a given VM needs a particular resource that is not available on a specific candidate node, then that candidate node is said to not satisfy the high availability threshold, and is not considered for reserving resources for the given VM.

In operation 326, the scheduling module selects the highest-ranked node that satisfies the high-availability admission threshold. In operation 328, the scheduling module reserves a parcel of resources on the selected node for failover of the VM. During the process of reservation of parcels on selected nodes for VMs in the cluster, the scheduling module may identify whether there is a lack of sufficient resources on available nodes to reserve parcels of resources for all the VMs.

In operation 330, the scheduling module determines whether one or more nodes need to be added to the cluster in order to reserve parcels of resources for all the VMs in anticipation of the possibility of N-node failover. If not, in operation 335, the scheduling module sends a response to the original request indicating that the proposed change does not violate the goal of maintaining high availability of resources within the cluster.

In operation 340, if one or more nodes need to be added to the cluster, the scheduling module may determine whether the required number of nodes are available to be added to the cluster. In operation 345a, if nodes are not available to be added, the scheduling module may send a response to the original request indicating that the proposed change would violate the goal of maintaining high availability of resources within the cluster. In operation 345b, if nodes are available to be added, the scheduling module may add the required number of nodes to the cluster. The scheduling module may also redistribute amongst the nodes VMs as appropriate in order to rebalance VMs across the cluster. Finally, in operation 350, the scheduling module may send a response to the original request indicating that the proposed change does not violate the goal of maintaining high availability of resources within the cluster.

Figure 4:
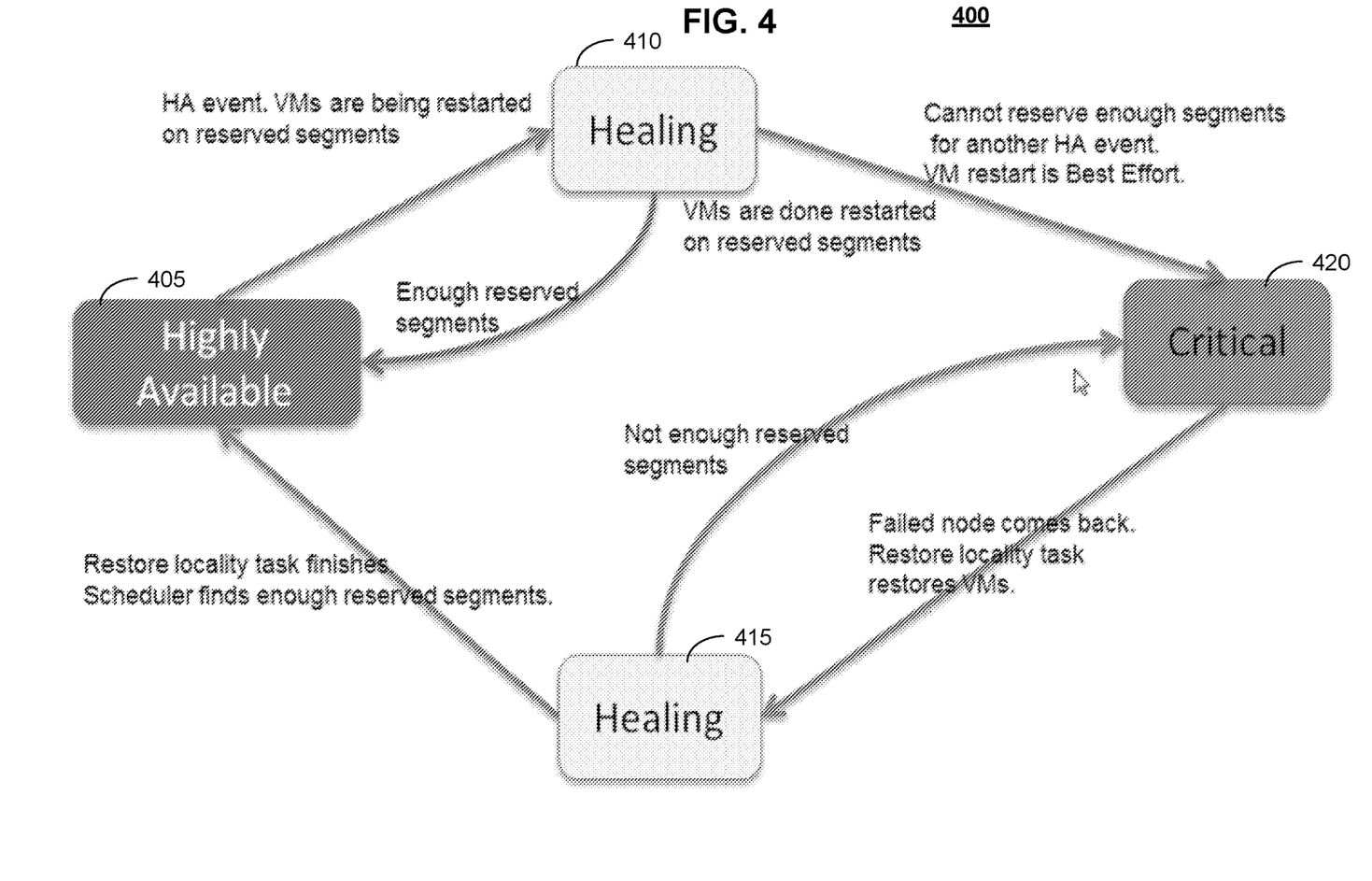
FIG. 4 is an example state diagram for using the reserving resources during a failure of a node in the virtualization environment of FIG. 1A, in accordance with some embodiments of the present disclosure.

FIG. 4 is an example state diagram 400 for illustrating an example resource allocation during a failover event of one node, in accordance with some embodiments of the present disclosure. The state diagram 400 may include four states: a highly available state 405, a first healing state 410, a second healing state 415, and a critical state 420. The state diagram 400 is implemented by the scheduling module and may be invoked upon a detected failure of a node. Before any node failure, the scheduling module remains on the highly available state 405. When a node failure occurs, the scheduling module moves from the highly available state 405 to the first healing state 410. As part of transitioning to the first healing state 410, the scheduling module moves (e.g., migrates and restarts) the VMs from the failed node to their respective reserved parcels or segments. As discussed above, the reserved parcel or segment of each of the VM on each of the nodes in the virtualization environment 100 is pre-determined at the time of the creation of that VM. Thus, at the time of failure of a node, the scheduling node already knows the reserved parcels or segments for each VM on the failed node.

Once the VMs from the failed node are restarted on the reserved parcel or segment, the scheduling module determines whether the virtualization environment 100 has capability for handling additional node failures. For example and as discussed above, in some embodiments, the scheduling module may have allocated reserved parcels to handle a single node failure. In such cases, if a second node fails, the scheduling module may not have reserved segments for the VMs on the second failed node. In other embodiments, the scheduling module may have allocated reserved parcels to handle more than one (e.g., two) node failures.

Thus, at the first healing state 410, the scheduling module determines if the scheduling module is capable of handling additional node failures. For example, if the scheduling module is configured to handle a single node failure, then the scheduling module may not be able to move VMs to their reserved parcels in the event of another node failure. In such a case, the scheduling module may transition from the first healing state 410 to the critical state 420. On the other hand, if the scheduling module determines at the first healing state 410 that additional node failures may be handled (e.g., by guaranteeing reserved parcels of additional VMs), the scheduling module goes back to the highly available state 405. The scheduling module then remains in the highly available state 405 until another node failure is detected.

If the scheduling module is at the critical state 420, the scheduling module remains at this state until the failed node has recovered or has been fixed. When the failed node comes back up, the VMs that had migrated to the reserved segments are moved back to the recovered node, thereby recovering the reserved parcels or segments. These recovered parcels or segments can again be used for another node failure. Along with moving the VMs back, the scheduling module transitions to the second healing state 415. If at the second healing state 415, the scheduling module determines that not enough reserved segments have been recovered (e.g., due to one or more VMs not being able to move back to the recovered node), the scheduling module goes back to the critical state 420. The scheduling module keeps moving between the critical state 420 and the second healing state 415 until enough number of reserved segments or parcels have been recovered. What constitutes "enough" may vary from one embodiment to another.

For example, in some embodiments, "enough" may mean all VMs that had moved to their respective reserved parcels. In other embodiments, "enough" may be defined in terms of a percentage, number, or other function of the reserved parcels that have been recovered. Once enough reserved parcels have been recovered, the scheduling module goes back to the highly available state 405 and waits for another node failure.

Figure 5:
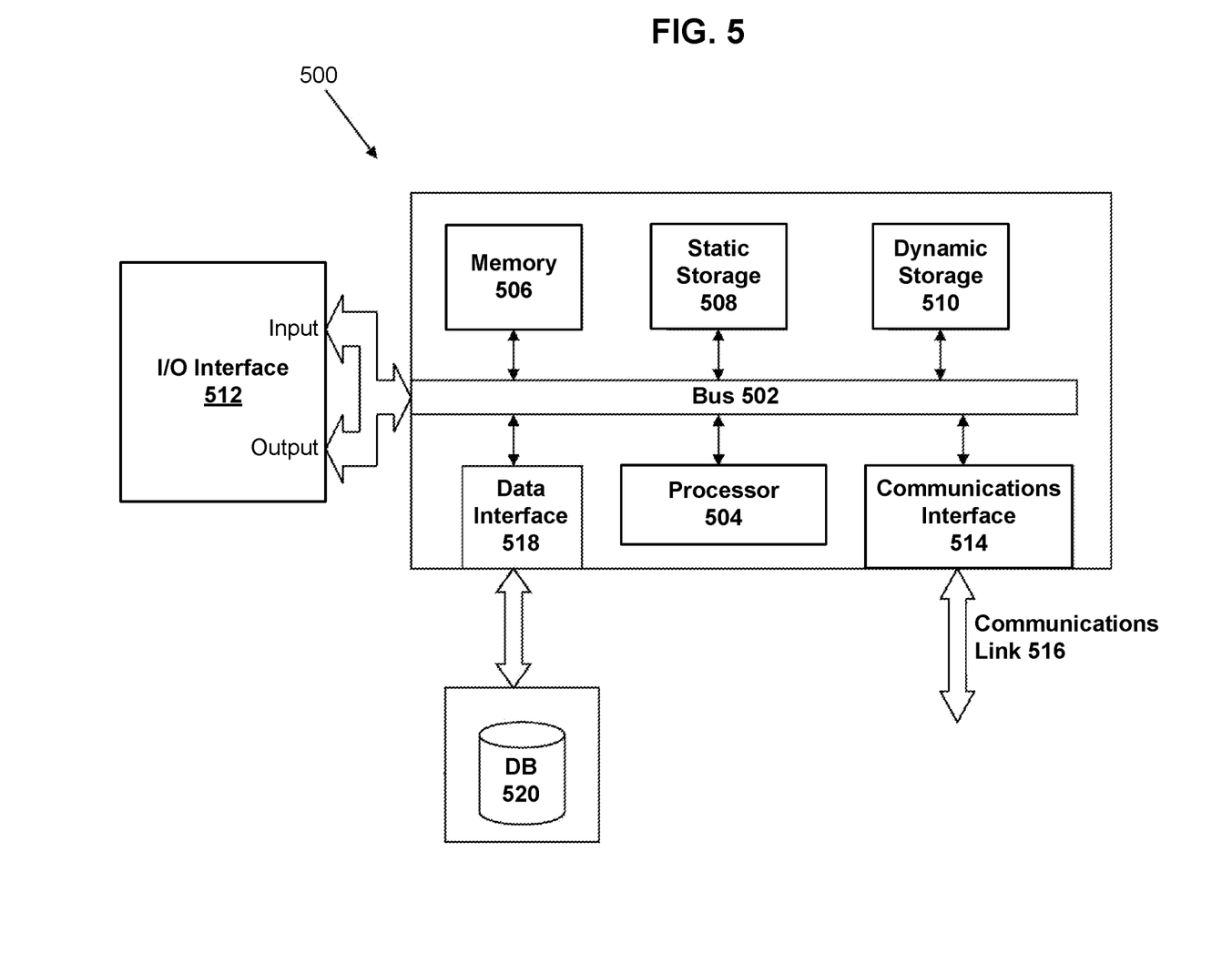
FIG. 5 is a block diagram of a computing system suitable for implementing particular embodiments disclosed herein.

FIG. 5 is a block diagram of an illustrative computing system 500 suitable for implementing particular embodiments. In particular embodiments, one or more computer systems 500 perform one or more operations of one or more methods described or illustrated herein. In particular embodiments, one or more computer systems 500 provide functionality described or illustrated herein. In particular embodiments, software running on one or more computer systems 500 performs one or more operations of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a mainframe, a mesh of computer systems, a server, a laptop or notebook computer system, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more operations of one or more methods described or illustrated herein. As an example and not by way of limitation, one or more computer systems 500 may perform in real time or in batch mode one or more operations of one or more methods described or illustrated herein. One or more computer systems 500 may perform at different times or at different locations one or more operations of one or more methods described or illustrated herein, where appropriate.

Computer system 500 includes a bus 502 (e.g., an address bus and a data bus) or other communication mechanism for communicating information, which interconnects subsystems and devices, such as processor 504, memory 506 (e.g., RAM), static storage 508 (e.g., ROM), dynamic storage 510 (e.g., magnetic or optical), communication interface 514 (e.g., modem, Ethernet card, a network interface controller (MC) or network adapter for communicating with an Ethernet or other wire-based network, a wireless NIC (WNIC) or wireless adapter for communicating with a wireless network, such as a WI-FI network), input/output (I/O) interface 512 (e.g., keyboard, keypad, mouse, microphone). In particular embodiments, computer system 500 may include one or more of any such components.

In particular embodiments, processor 504 includes hardware for executing instructions, such as those making up a computer program. As an example and not by way of limitation, to execute instructions, processor 504 may retrieve (or fetch) the instructions from an internal register, an internal cache, memory 506, static storage 508, or dynamic storage 510; decode and execute them; and then write one or more results to an internal register, an internal cache, memory 506, static storage 508, or dynamic storage 510. In particular embodiments, processor 504 may include one or more internal caches for data, instructions, or addresses. This disclosure contemplates processor 504 including any suitable number of any suitable internal caches, where appropriate. As an example and not by way of limitation, processor 504 may include one or more instruction caches, one or more data caches, and one or more translation lookaside buffers (TLBs). Instructions in the instruction caches may be copies of instructions in memory 506, static storage 508, or dynamic storage 510, and the instruction caches may speed up retrieval of those instructions by processor 504. Data in the data caches may be copies of data in memory 506, static storage 508, or dynamic storage 510 for instructions executing at processor 504 to operate on; the results of previous instructions executed at processor 504 for access by subsequent instructions executing at processor 504 or for writing to memory 506, static storage 508, or dynamic storage 510; or other suitable data. The data caches may speed up read or write operations by processor 504. The TLBs may speed up virtual-address translation for processor 504. In particular embodiments, processor 504 may include one or more internal registers for data, instructions, or addresses. This disclosure contemplates processor 504 including any suitable number of any suitable internal registers, where appropriate. Where appropriate, processor 504 may include one or more arithmetic logic units (ALUs); be a multi-core processor; or include one or more processors 502. Although this disclosure describes and illustrates a particular processor, this disclosure contemplates any suitable processor.

In particular embodiments, I/O interface 512 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 512 for them. Where appropriate, I/O interface 512 may include one or more device or software drivers enabling processor 504 to drive one or more of these I/O devices. I/O interface 512 may include one or more I/O interfaces 512, where appropriate. Although this disclosure describes and illustrates a particular I/O interface, this disclosure contemplates any suitable I/O interface.

In particular embodiments, communication interface 514 includes hardware, software, or both providing one or more interfaces for communication (such as, for example, packet-based communication) between computer system 500 and one or more other computer systems 500 or one or more networks. As an example and not by way of limitation, communication interface 514 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 514 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 514 for any of these networks, where appropriate. Communication interface 514 may include one or more communication interfaces 514, where appropriate. Although this disclosure describes and illustrates a particular communication interface, this disclosure contemplates any suitable communication interface.

One or more memory buses (which may each include an address bus and a data bus) may couple processor 504 to memory 506. Bus 502 may include one or more memory buses, as described below. In particular embodiments, one or more memory management units (MMUs) reside between processor 504 and memory 506 and facilitate accesses to memory 506 requested by processor 504. In particular embodiments, memory 506 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 506 may include one or more memories 506, where appropriate. Although this disclosure describes and illustrates particular memory, this disclosure contemplates any suitable memory.

Where appropriate, the ROM may be mask-programmed ROM, programmable ROM (PROM), erasable PROM (EPROM), electrically erasable PROM (EEPROM), electrically alterable ROM (EAROM), or flash memory or a combination of two or more of these. In particular embodiments, dynamic storage 510 may include a hard disk drive (HDD), a floppy disk drive, flash memory, an optical disc, a magneto-optical disc, magnetic tape, or a Universal Serial Bus (USB) drive or a combination of two or more of these. Dynamic storage 510 may include removable or non-removable (or fixed) media, where appropriate. Dynamic storage 510 may be internal or external to computer system 500, where appropriate. This disclosure contemplates mass dynamic storage 510 taking any suitable physical form. Dynamic storage 510 may include one or more storage control units facilitating communication between processor 504 and dynamic storage 510, where appropriate.

In particular embodiments, bus 502 includes hardware, software, or both coupling components of computer system 500 to each other. As an example and not by way of limitation, bus 502 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 502 may include one or more buses 506, where appropriate. Although this disclosure describes and illustrates a particular bus, this disclosure contemplates any suitable bus or interconnect.

According particular embodiments, computer system 500 performs specific operations by processor 504 executing one or more sequences of one or more instructions contained in memory 506. Such instructions may be read into memory 506 from another computer readable/usable medium, such as static storage 508 or dynamic storage 510. In alternative embodiments, hard-wired circuitry may be used in place of or in combination with software instructions to implement particular embodiments. Thus, particular embodiments are not limited to any specific combination of hardware circuitry and/or software. In particular embodiments, the term "logic" shall mean any combination of software or hardware that is used.

The term "computer readable medium" or "computer usable medium" as used herein refers to any medium that participates in providing instructions to processor 504 for execution. Such a medium may take many forms, including but not limited to, nonvolatile media and volatile media. Non-volatile media includes, for example, optical or magnetic disks, such as static storage 508 or dynamic storage 510. Volatile media includes dynamic memory, such as memory 506.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In particular embodiments, execution of the sequences of instructions may be performed by a single computer system 500; in alternative embodiments, two or more computer systems 500 coupled by communication link 516 (e.g., LAN, PTSN, or wireless network) may perform the sequence of instructions in coordination with one another.

Computer system 500 may transmit and receive messages, data, and instructions, including program, i.e., application code, through communication link 516 and communication interface 514. Received program code may be executed by processor 504 as it is received, and/or stored in static storage 508 or dynamic storage 510, or other non-volatile storage for later execution. A database 520 may be used to store data accessible by the system 500 by way of data interface 518.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDS), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

It is also to be understood that in some embodiments, any of the operations described herein can be implemented at least in part as computer-readable instructions stored on a computer-readable memory. Upon execution of the computer-readable instructions by a processor, the computer-readable instructions can cause a node to perform the operations.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations can be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims can contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or can be acquired from practice of the disclosed embodiments. It is intended that the scope of the invention be defined by the claims appended hereto and their equivalents.

What is claimed is:

1. An apparatus comprising:
a scheduling module that reserves a resource for a virtual machine of a first node on a second node for operation of the virtual machine during failure of the first node, wherein to reserve the resource, the scheduling module includes programmed instructions to:
identify a list of candidate nodes;
rank the candidate nodes;
determine the candidate nodes that satisfy a high availability threshold; and
select a highest-ranked candidate node that satisfies the high availability threshold as the second node, wherein the high availability threshold is based upon the resource needed by the virtual machine, resources available on the candidate nodes, and adding additional nodes to the list of candidate nodes.

2. The apparatus of claim 1, wherein the scheduling module further includes programmed instructions to:
detect the failure of the first node; and
restart the virtual machine on the second node.

3. The apparatus of claim 1, wherein the scheduling module reserves the resource for the virtual machine on other ones of the candidate nodes in addition to the second node that satisfy the high availability threshold.

4. The apparatus of claim 1, wherein the second node reserves the resource for additional virtual machines.

5. The apparatus of claim 4, wherein at least some of the additional virtual machines reside on nodes other than the first node and the second node.

6. An apparatus comprising:
a scheduling module that reserves a resource for a virtual machine of a first node on a second node for operation of the virtual machine during failure of the first node, wherein to reserve the resource, the scheduling module includes programmed instructions to:
identify a list of candidate nodes;
rank the candidate nodes;
determine the candidate nodes that satisfy a high availability threshold;
select a highest-ranked candidate node that satisfies the high availability threshold as the second node;
detect the failure of the first node;
restart the virtual machine on the second node;
detect that the first node has recovered from the failure; and
move the virtual machine back to the first node.

7. The apparatus of claim 6, wherein the scheduling module reserves the resource for the virtual machine on other ones of the candidate nodes in addition to the second node that satisfy the high availability threshold.

8. The apparatus of claim 6, wherein the second node reserves the resource for additional virtual machines.

9. The apparatus of claim 8, wherein at least some of the additional virtual machines reside on nodes other than the first node and the second node.

10. An apparatus comprising:
a scheduling module that reserves a resource for a virtual machine of a first node on a second node for operation of the virtual machine during failure of the first node, wherein to reserve the resource, the scheduling module includes programmed instructions to:
identify a list of candidate nodes;
rank the candidate nodes;
determine the candidate nodes that satisfy a high availability threshold;
select a highest-ranked candidate node that satisfies the high availability threshold as the second node; and reserve the resource during creation of the virtual machine.

11. The apparatus of claim 10, wherein the scheduling module reserves the resource for the virtual machine on other ones of the candidate nodes in addition to the second node that satisfy the high availability threshold.

12. The apparatus of claim 10, wherein the second node reserves the resource for additional virtual machines.

13. The apparatus of claim 12, wherein at least some of the additional virtual machines reside on nodes other than the first node and the second node.

14. A method comprising:
identifying, by a scheduling module, candidate nodes for allocating a resource for a virtual machine that resides on a first node;
ranking, by the scheduling module, the candidate nodes;
determining, by the scheduling module, the candidate nodes that satisfy a high availability threshold;
reserving, by the scheduling module, the resource on a highest-ranked candidate node that satisfies the high availability threshold, wherein the virtual machine is configured to operate on the highest-ranked candidate node during failure of the first node; and
reserving, by the scheduling module, the resource for the virtual machine on additional candidate nodes that satisfy the high availability threshold.

15. The method of claim 14, wherein the resource on the highest-ranked candidate node is reserved for other virtual machines.

16. The method of claim 14, further comprising reserving, by the scheduling module, the resource during creation of the virtual machine.

17. The method of claim 14, further comprising:
determining, by the scheduling module, that the resource reserved for another virtual machine need to be changed for maintaining the high availability threshold; and
changing, by the scheduling module, the resource reserved for the another virtual machine for maintaining the high availability threshold.

18. The method of claim 14, wherein satisfying the high availability threshold comprises determining, by the scheduling module, that additional nodes need to be added to a cluster, wherein the candidate nodes, the first node, and the additional nodes are part of the cluster.

19. A non-transitory computer readable media with computer-executable instructions embodied thereon that, when executed by a processor, causes the processor to:
identify candidate nodes that include a resource for a virtual machine of a first node;
rank the candidate nodes based on a priority function;
determine which candidate nodes satisfy a high availability threshold;
select a highest-ranked candidate node of the determined candidate nodes that satisfy the high availability threshold;
reserve the resource on the selected highest-ranked candidate node for the virtual machine for operation during failure of the first node; and
reserve the resource for the virtual machine on a plurality of the candidate nodes.

20. The non-transitory computer readable media of claim 19, wherein the processor further reserves the resource of the highest-ranked candidate node for more than one virtual machine.

21. The non-transitory computer readable media of claim 19, wherein the processor further reserves the resource for the virtual machine during creation of the virtual machine on the first node.

22. The non-transitory computer readable media of claim 21, wherein the processor further determines whether reservation of the resource for another virtual machine needs to be changed, and wherein the processor changes the reservation of the resource for the another virtual machine.

23. A non-transitory computer readable media with computer-executable instructions embodied thereon that, when executed by a processor, causes the processor to:
reserve a resource for a virtual machine on a second node, wherein the virtual machine originally resides on a first node, and wherein the second node is identified from a list of candidate nodes based upon a high availability threshold;
restart the virtual machine on the second node upon detecting a failure in the first node;
enter into a critical state upon determining that additional node failures cannot be handled;
restart the virtual machine on the first node upon determining that the failure on the first node has resolved; and
enter into a highly available state for handling another node failure.

24. The non-transitory computer readable media of claim 23, wherein the processor further:
identifies the candidate nodes based upon a qualifier function;
ranks the candidate nodes based upon a priority function;
determines the candidate nodes that satisfy the high availability threshold; and
selects a highest-ranked candidate node that satisfies the high availability threshold as the second node.

25. The non-transitory computer readable media of claim 23, wherein the processor further reserves the resource for the virtual machine on the second node and an additional node from the candidate nodes that satisfy the high availability threshold.

* * * * *